United States Patent [19]

Fujiwara

[11] Patent Number: 5,360,047

[45] Date of Patent: Nov. 1, 1994

[54] HEAVY DUTY RADIAL TIRE WITH SPECIFIED BELT RADIUS

[75] Inventor: Kenichi Fujiwara, Miki, Japan

[73] Assignee: Sumitomo Rubber Industries, Ltd., Kobe, Japan

[21] Appl. No.: 972,909

[22] Filed: Nov. 6, 1992

[30] Foreign Application Priority Data

Nov. 8, 1991 [JP] Japan ................................ 3-320989
Nov. 8, 1991 [JP] Japan ................................ 3-320990

[51] Int. Cl.$^5$ .......................... B60C 3/04; B60C 9/20; B60C 9/28
[52] U.S. Cl. .................... 152/454; 152/534; 152/538
[58] Field of Search ................. 152/538, 454, 534

[56] References Cited

U.S. PATENT DOCUMENTS

| | | | |
|---|---|---|---|
| 4,215,734 | 8/1980 | Suzuki et al. | 152/454 X |
| 4,328,850 | 5/1982 | Uemura | 152/454 X |
| 4,408,648 | 10/1983 | Ohashi | 152/454 |
| 4,856,572 | 8/1989 | Casanova et al. | 152/454 |
| 5,131,446 | 7/1992 | Fukumoto et al. | 152/538 X |
| 5,154,217 | 10/1992 | Kanamaru | 152/538 X |
| 5,201,969 | 4/1993 | Nishi et al. | 152/538 X |
| 5,203,934 | 4/1993 | Iida et al. | 152/454 |

FOREIGN PATENT DOCUMENTS

| | | | |
|---|---|---|---|
| 58-126204 | 7/1983 | Japan | 152/538 |
| 2204103 | 8/1990 | Japan | 152/454 |

*Primary Examiner*—Michael Ball
*Assistant Examiner*—Adrienne J. Johnstone

[57] ABSTRACT

A heavy duty radial tire, which comprises a belt comprising three plies of cords laid at an angle of from 5 to 70 degrees with respect to the tire equator, the widest belt ply defining a belt radius as measured from the tire axis to the radially inner surface thereof, the difference (RB1-RB2) of the belt radius (RB1) measured at a pair of axially inner points P from the belt radius (RB2) measured at a pair of axially outer points Q in an unloaded state being in the range of 0 to 0.05 times a half ground contacting width SL, each inner point P spaced apart from the tire equator toward each side thereof by a distance of 0.25 times the axial width (BWM) of the widest belt ply, each outer point Q located axially outward of each inner point P and spaced apart from the tire equator by a distance of 0.45 times the axial width (BWM) of the widest belt ply, whereby uneven tread wear between the tread crown and tread shoulder is reduced without deteriorating high-speed durability.

2 Claims, 7 Drawing Sheets

HEAVY DUTY RADIAL TIRE WITH SPECIFIED BELT RADIUS

BACKGROUND OF THE INVENTION

The present invention relates to a belted radial tire for heavy duty use such as truck/bus tires, in which uneven wear of the tread between the tread crown and tread shoulder is effectively reduced without deteriorating high-speed durability.

Figure 7:
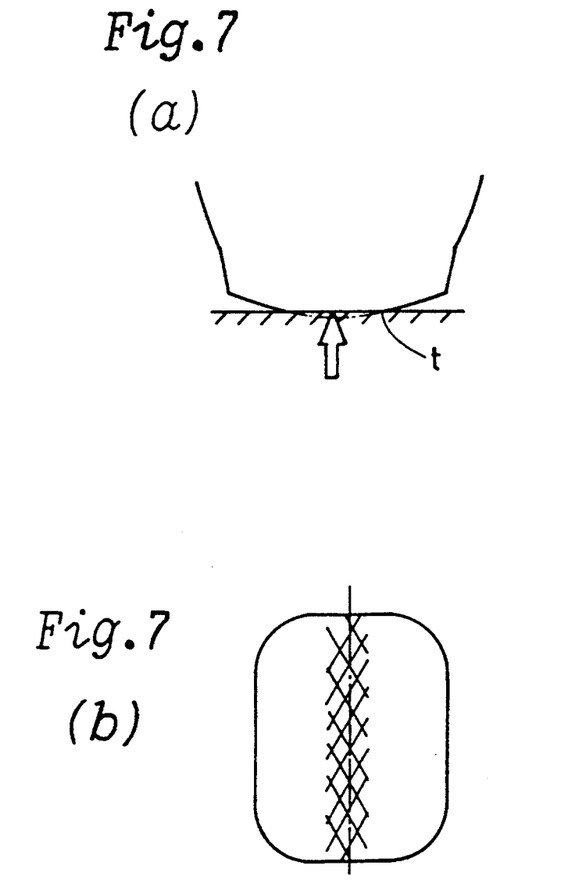
FIGS. 7(a) and 7(b) are a schematic cross sectional view of a prior art tire and a view showing an uneven ground pressure distribution thereof.
Figure 8:
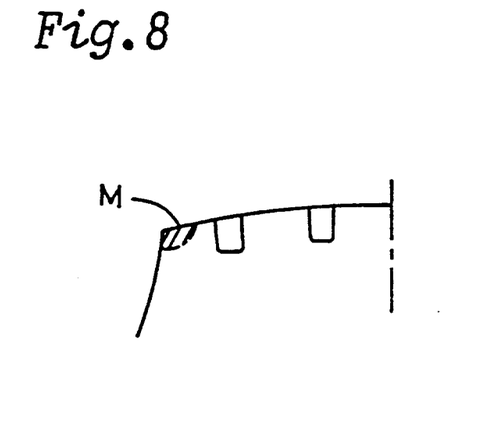
FIG. 8 is a cross sectional view of a tire tread showing uneven wear.

In a heavy duty radial tire which is provided radially outward of the radial carcass with a stiff belt made of steel cords, the tread is liable to wear unevenly between the tread crown and the tread shoulder. That is, as shown in FIG. 8, so called shoulder wear (M) is liable to occur. The main cause of such uneven wear has been known to be an uneven ground pressure distribution, and the cause of such uneven distribution is known to be a small radius of curvature of the tread profile. As shown in FIGS. 7(A) and 7(B), when the tread radius is small, the ground pressure is higher in the tread crown than the tread shoulder, and the amount of slip against the ground becomes larger in the tread shoulder. As a result, shoulder wear is caused.

In order to even the ground pressure distribution, heretofore, the tread radius has been increased so as to provide a flat tread profile by increasing the tread rubber thickness in the tread shoulder.

Figure 6:
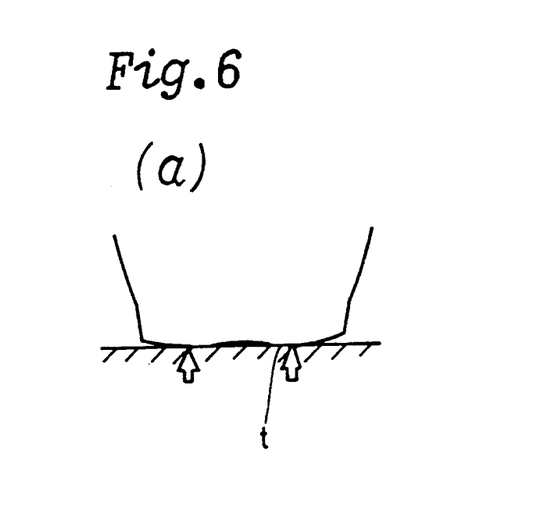
FIGS. 6(a) and 6(b) are a schematic cross sectional view of a prior art tire and a view showing an uneven ground pressure distribution thereof.

In this method, however, it is very difficult to control the ground pressure distribution, and the ground pressure is liable to increase in the tread shoulder as shown in FIGS. 6(A) and 6(B), which again results in uneven wear. Further, because of the increased rubber thickness, heat generation increases in the tread shoulder, which induces a belt ply edge separation from the surrounding rubber and decreases high speed durability.

On the other hand, truck/bus tires are often reused by being retreaded. In a general retreading process, the worn tread rubber is removed automatically along a programmed curvature or a convex profile by machinery. Therefore, if a tire having a belt of which edges are radially outwardly curved is included, the belt of such a tire is damaged, and the yield of retreading is decreased. Thus, such a truck/bus tire must be designed paying attention to the yield of retreading.

SUMMARY OF THE INVENTION

It is therefore, an object of the present invention to provide a radial tire for heavy duty use, in which uneven wear between the tread crown and tread shoulder is effectively reduced without deteriorating high speed durability.

According to one aspect of the present invention, a heavy duty radial tire comprises a belt disposed radially outside a carcass and comprising at least three plies of parallel cords laid at an angle of from 5 to 70 degrees with respect to the tire equator, the widest belt ply defining a belt radius as measured from the tire axis to the radially inner surface thereof, the difference (RB1–RB2) of the belt radius (RB1) measured at a pair of axially inner points P from the belt radius (RB2) measured at a pair of axially outer points Q in an unloaded state being in the range of 0 to 0.05 times a half ground contacting width SL in a loaded state, wherein the pair of axially inner points P are each spaced apart from the tire equator toward each side thereof by a distance of 0.25 times the axial width (BWM) of the widest belt ply, the pair of axially outer points Q are each located axially outward of each of the inner points P and spaced apart from the tire equator by a distance of 0.45 times the axial width (BWM) of the widest belt ply, the unloaded state is such that the tire is mounted on its regular rim and inflated to its regular inner pressure but loaded by no tire load, the loaded state is such that the tire is mounted on its regular rim and inflated to its regular inner pressure and loaded with its regular tire load, and the half ground contacting width SL is ½ of the axial width measured in the unloaded state between two points on the tread face which two points correspond to the axially outermost edges of the ground contacting area of the tread face in the loaded state.

BRIEF DESCRIPTION OF THE DRAWINGS

FIGS. 4(a–b) and 5(a–b) are graphs showing the results of high speed durability tests;

DESCRIPTION OF THE PREFERRED EMBODIMENT

An embodiment of the present invention will now be described in detail in conjunction with the accompanying drawings.

Figure 1:
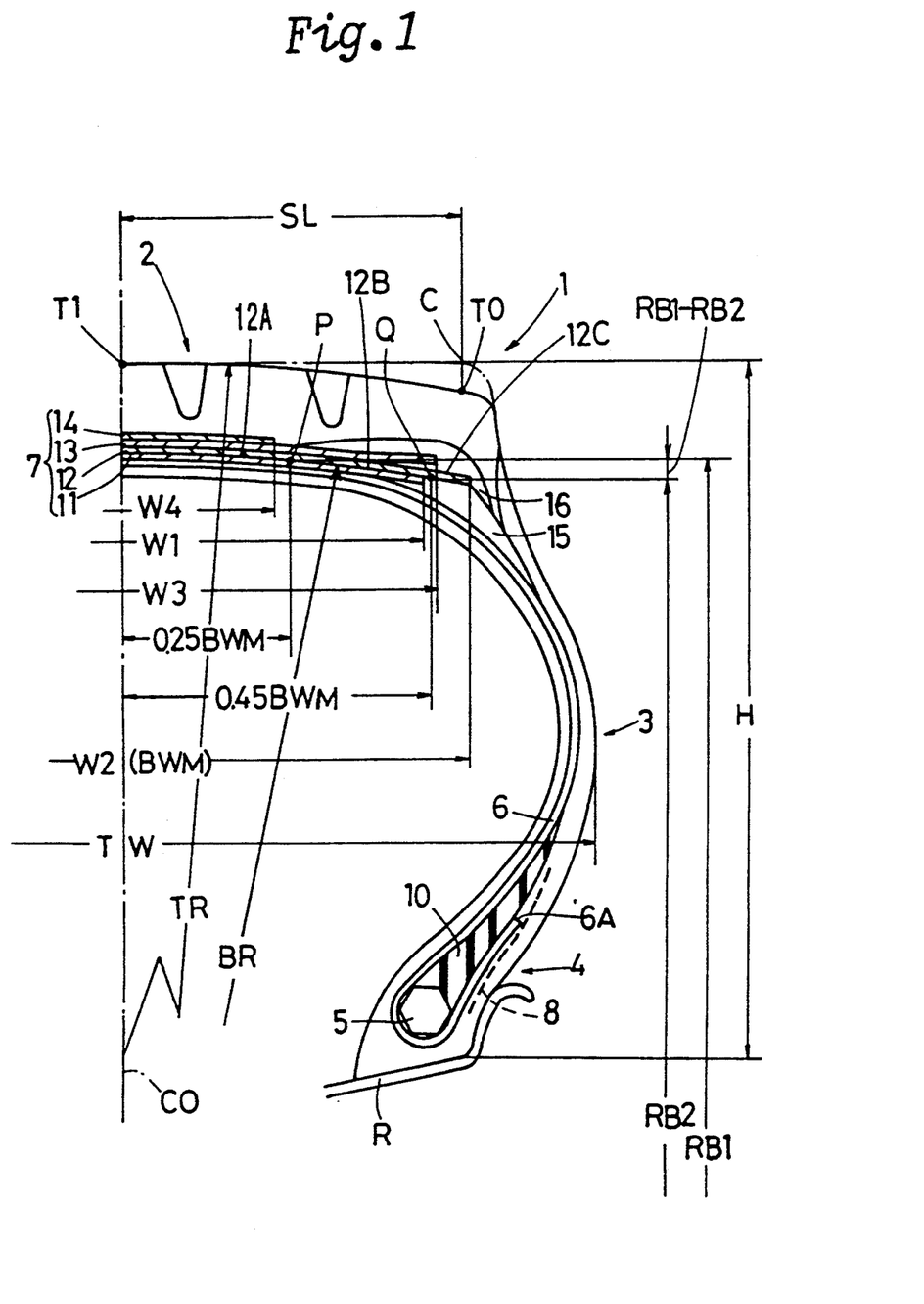
FIG. 1 is a cross sectional view of an embodiment of the present invention showing a right half thereof.

FIG. 1 shows a truck/bus radial tire 1 of the present invention placed in an unloaded state that the tire is mounted on its regular rim R and inflated to its regular inner pressure but loaded by no load. Here, the regular rim R is a rim officially approved for the tire by TRA (USA) and ETRTO (Europe), and the regular inner pressure and the regular load are the maximum air pressure and the maximum tire load for the tire officially specified in Air-pressure/Maximum-load Table by the same associations.

In FIG. 1, the tire 1 comprises a tread portion 2, a pair of axially spaced bead portions 4, a pair of sidewall portions 3 extending therebetween, a bead core 5 disposed in each of the bead portions 4, a carcass 6 extending between the bead portions 4 and turned up around the bead cores 5 from the axially inside to the axially outside of the tire to be secured thereto, and a belt 7 disposed radially outside the carcass 6.

The carcass 6 in this embodiment is composed of only one ply of steel cords arranged radially at an angle of 90 degrees with respect to the tire equator CO. However, the carcass can be composed of a plurality of plies of cords, and the carcass cords can be laid at an angle in the rang of 60 to 90 degrees, and further organic fiber cords, e.g. aramid, nylon, rayon, polyester and the like can be used for the carcass cords.

The carcass ply extends between the bead portions 4 and turned up around the bead cores 5, and each turned up portion has a radially outer edge 6A located radially outward of the bead core 5 and radially inward of the tire maximum width position.

Each bead portion 4 is provided with a rubber bead apex 10 and a reinforcing layer 8. The bead apex 10 is disposed between the main portion and each turned up portion of the carcass and extends taperingly radially outwardly from the bead core 5. The reinforcing layer 8 is made of rubberized organic fiber cords and extends along the axially outside of the carcass 6 to cover the radially outer edge of the carcass ply turned up portion.

Further, each bead portion 4 may be provided with a reinforcing cord layer disposed between the bead core and the adjacent carcass ply to prevent abrasion of the carcass ply by the bead core and to increase bead rigidity. Furthermore, a chafer for preventing rim chafing may be disposed along the bottom face and side face of the bead portion 4.

The belt 7 comprises at least three cross plies of parallel cords laid at an angle of 5 to 70 degrees with respect to the tire equator CO.

In this embodiment, the belt 7 is composed of a first ply 11, a second ply 12, a third ply 13, and a fourth ply 14, which are disposed in that order from the carcass 6 to the tread surface.

The belt 7 can further include a band belt ply (not shown) disposed over the belt plies 11-14 to cover the edges of the inner three belt plies 11-13. The band belt ply is made of organic fiber cords laid substantially in parallel with the tire equator or at a small angle to the tire equator.

In each ply, steel cords are used, but organic fiber cords, e.g. aramid, nylon, rayon, polyester and the like may be used.

The first belt ply 11 is disposed on the carcass, and for the most part contacts with the radially outer surface of the carcass, but each edge part thereof is spaced apart therefrom so as to gradually increase the distance therebetween towards the edge.

The cords in the first belt ply 11 are inclined at a larger angle of 50 to 70 degrees with respect to the tire equator CO.

The second belt ply 12 is disposed on the radially outer surface of the first belt ply 11 and extends axially outwardly over the edges of the first belt ply 11.

The cords in the second belt ply 12 are inclined toward the same direction as the first belt ply at a smaller angle of 14 to 22 degrees with respect to the tire equator CO.

The third belt ply 13 is disposed on the radially outer surface of the second belt ply 12, and for the most part contacts with the outer surface of the second belt ply 12, but each edge part is spaced apart therefrom by bending radially outwardly so as to gradually increase the distance therebetween towards the edge.

The cords in the third belt ply 13 are inclined toward the reverse direction to the second belt ply at an angle of 14 to 22 degrees with respect to the tire equator CO.

The fourth belt ply 14 is disposed on the radially outer surface of the third belt ply 13 to protect the first through third belt plies 11, 12 and 13 from injury.

Therefore, the inner three plies 11-13 cross each other to form a rigid triangular structure by their cords.

As shown in FIG. 1, the axial width W1 of the first belt ply 11, the axial width W2 of the second belt ply 12, the axial width W3 of the third belt ply 13, and the axial width W4 of the fourth belt ply 14 are as follows:

$$W4 < W1 < W3 < W2$$

Therefore, the maximum width BWM is of the second belt ply 12.

The axial width BWM of the widest belt ply 12 is 0.68 to 0.95 times the maximum tire section width TW. If the aspect ratio of the tire is in the range of 0.85 to 1.21, the width BWM is preferably set in the range of 0.68 to 0.95 times the width TW. If the aspect ratio is less than 0.85 and not less than 0.70, the width BWM is in the range of 0.7 to 0.95 times the width TW. Here, the aspect ratio is a ratio of the tire section height H to the tire section width TW. When the width BWM is smaller than the lower limit (0.68 or 0.7 times TW), the rigidity of the tread shoulder portion decreases and high speed durability is deteriorated. When the width BWM is larger than the upper limit (0.95 times TW), belt ply edge separation is liable to occur.

The third belt ply width W3 is slightly larger than the first belt ply width W1, and the difference is set in the range of about 4 to 10 mm.

The difference between the second belt ply width W2 and the third belt ply width W5 is set in the range of about 5 to 15 mm.

The fourth belt ply W4 is in the range of 45 to 10% of the third belt ply W3.

The edges of the first through third belt plies 11, 12, and 13 are wrapped with cushion rubber strips 15 and 16 which are inserted in the resultant wedge-shaped spaces between the plies. Therefore, a stress concentration on the ply edge is mitigated and a ply edge separation is prevented.

The widest belt ply 12 is provided with the following profile.

First, a pair of axially inner points P and a pair of axially outer points Q are defined on the radially inner surface of the widest belt ply 12. One of the inner points P is located on each side of the tire equator CO and spaced apart from the tire equator CO by a distance of 0.25 times the axial width BWM of the widest belt ply 12. Each of the axially outer points Q is located axially outward of each of the inner points P and spaced apart from the tire equator CO by a distance of 0.45 times the axial width BWM of the widest belt ply 12.

Preferably, the radius of the widest belt ply 12 measured from the tire axis to the radially inner surface thereof is gradually decreased from the axially inner point P to the axially outer point Q.

The difference (RB1-RB2) of the radius RB1 measured at the axially inner point P from the radius RB2 measured at the axially outer point Q is in the range of 0 to 0.05 times a half ground contacting width SL. Here, the half ground contacting width SL is ½ of the axial width measured between two points TO on the tread face under an unloaded condition that the tire is mounted on it regular rim and inflated to its regular pressure and loaded by no load. The two points correspond to the axially outermost edges of the ground contacting region of the tread face under a loaded condition that the tire is mounted on it regular rim and inflated to its regular pressure and loaded by its regular load. In practice, however, the width SL is regarded as being equal to ½ of the maximum width of the footprint. If the difference is larger than 0.05 times SL, uneven wear greatly increases, and the durability of the tread portion 2 is lost. If the difference is smaller than 0 (that is, RB2>RB1), the belt edges are liable to be damaged during retreading, and the yield of retreading is decreased as explained above.

The radially inner surface of the widest belt ply 12 is composed of a central part 12A extending between the two axially inner points P and P and provided with a single radius of curvature having a center on the tire equator CO, and a pair of lateral parts 12B each extending from the inner points P to the axially outer edges of the ply 12 and each provided with a single radius BR of curvature.

The curvature of the central part 12A and that of each lateral part 12B are smoothly connected to each other so as not to form an inflection point therebetween.

The radius BR is in the range of 2.0 to 2.8 times the maximum tire section width TW. If the radius BR is less than 2.0 times TW, uneven wear is caused in the tread shoulder regions. If the radius is more than 2.8 times TW, the belt edges are liable to be damaged during retreading, and the yield of retreading is decreased as explained above.

Further, the tread portion 2 is provided with a single radius TR of curvature or profile having a center on the tire equator CO.

The tread radius TR is in the range of 1.89 to 2.11 times the maximum tire section width TW. When the radius TR is less than 1.89 times TW, shoulder wear is liable to occur as shown in FIG. 8. When the radius TR is more than 2.11 times TW, the temperature of the tread portion increases and high speed durability is decreased.

Figure 2:
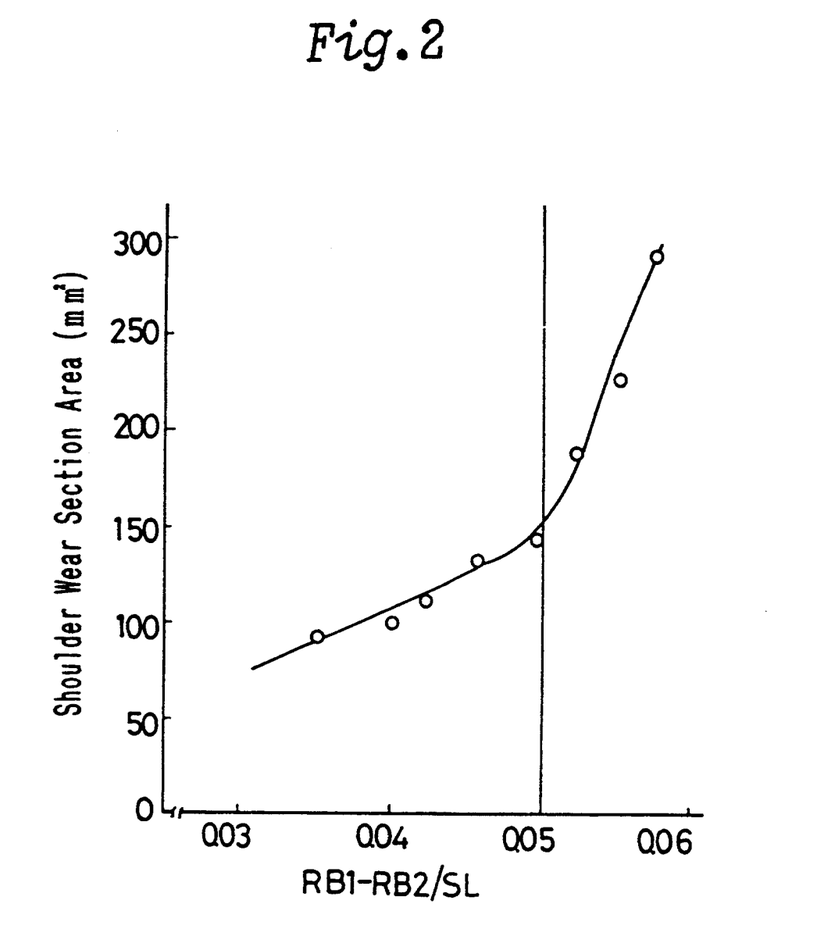
FIGS. 2 and 3 are graphs showing the results of shoulder wear tests.

FIG. 2 shows the results of a shoulder wear test which was made varying the quotient (RB1-RB2)/SL of the difference RB1-RB2) divided by the half ground contacting width SL. Test tires were mounted on the front wheels of a 2-DD wheel type truck and run for 100,000 km, and then the cross sectional area of the unevenly worn out part of the tread rubber was measured in the tread shoulder portion as the amount of shoulder wear. The size of the test tires was 285/75R24.5. The tread pattern was a five rib tread pattern with four zigzag grooves.

As apparent from the graph, it was confirmed that the amount of shoulder wear abruptly increases when the quotient (RB1-RB2)/SL increases over 0.05.

Figure 3:
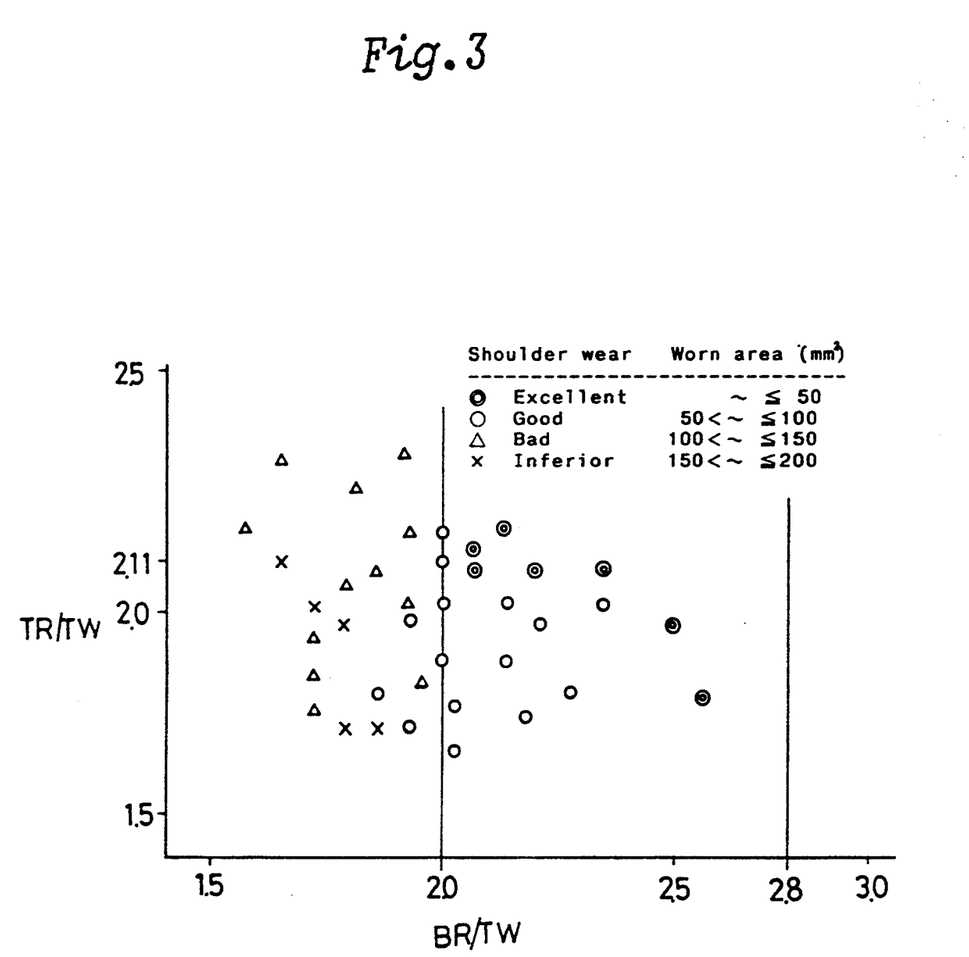

FIG. 3 shows the results of another test for shoulder wear which was made varying the quotient BR/TW of the widest belt ply radius BR divided by the tire width TW and the quotient TR/TW of the tread radius TR divided by the tire width TW. The tire size was 285/75R24.5 and 11R24.5. Test method and conditions were the same as the above shoulder wear test.

From the test results, it was confirmed that the shoulder wear is effected by the widest belt ply radius BR rather than the tread radius TR, and that the shoulder wear is reduced when the quotient BR/TW is more than 2.0.

Figure 4A:
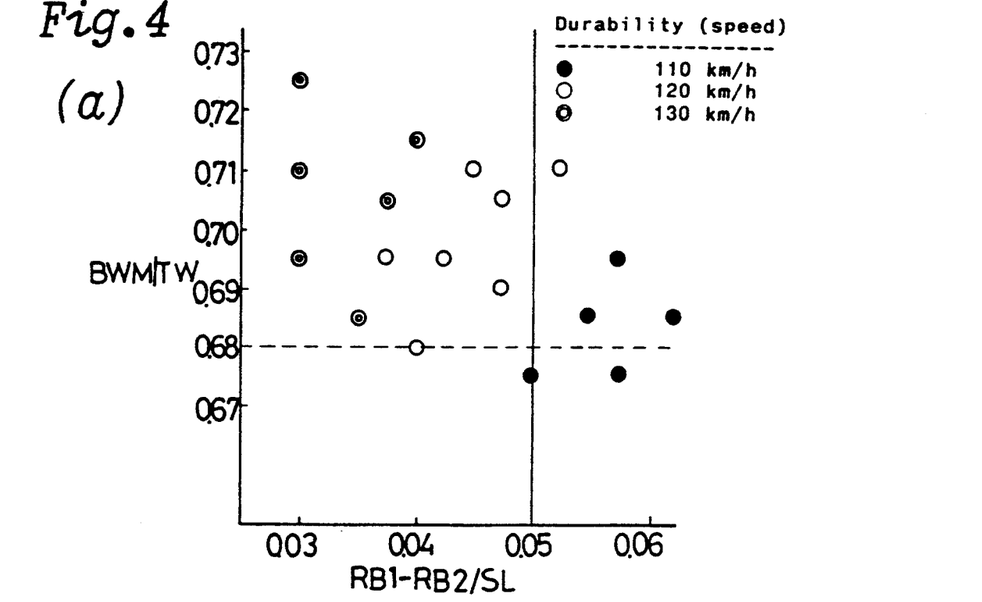
Figure 4B:
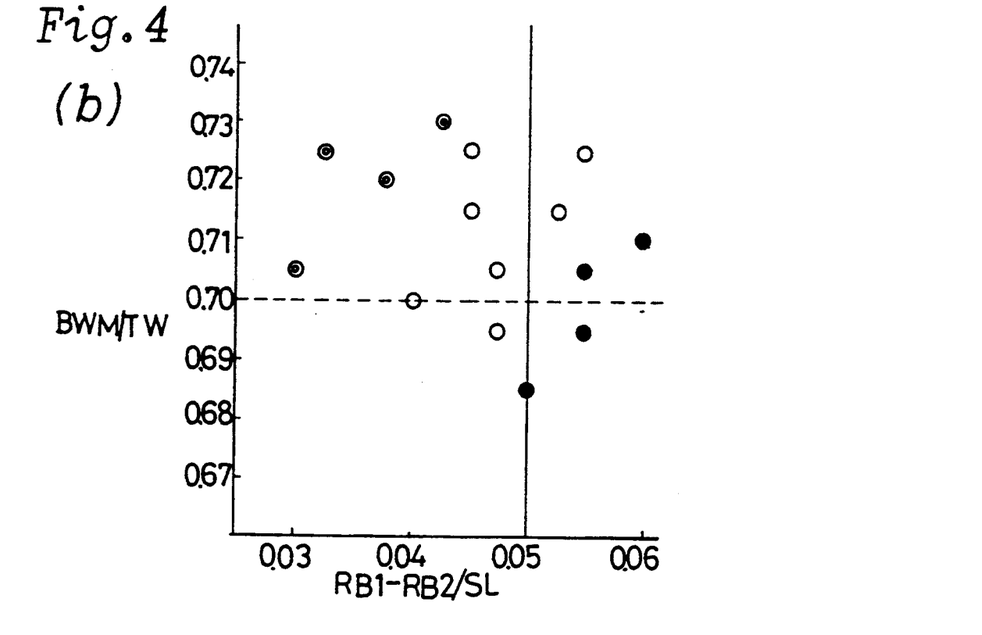

FIGS. 4(a) and 4(b) show the results of a high speed durability test which was made using a test drum. The test tire was mounted on a regular rim and inflated to a regular pressure and loaded by 140% of a regular load, and the running speed was increased every two hours at steps of 10 km/h from an initial speed of 90 km/h. Then, the speed at which the tread shoulder portion was cracked was measured as the durability.

From the test results, it was confirmed that, between a tire group having aspect ratios of more than 0.85 and a tire group having aspect ratios of less than 0.85, the distributional patterns of durability were shifted in the BWM/TW axis direction by about 0.02. The tire size in FIG. 4(a) was 11R24.5, therefore, the aspect ratio was more than 0.85. The tire size in FIG. 4(b) was 285/75 R24.5, and the aspect ratio was less than 0.85.

It was also confirmed that when BWM/TM was more than 0.68, a good durability could be obtained in the tires having an aspect ratio being not less than 0.85 and less than 1.2, and that when BWM/TM was more than 0.70, a good durability could be obtained in the test tires having an aspect ratio being not less than 0.7 and less than 0.85.

On the other hand, when BWM/TW was more than 0.95, as the rubber thickness between the belt edge and the tire side face was decreased, tread rubber separation is liable to occur.

Figure 5:
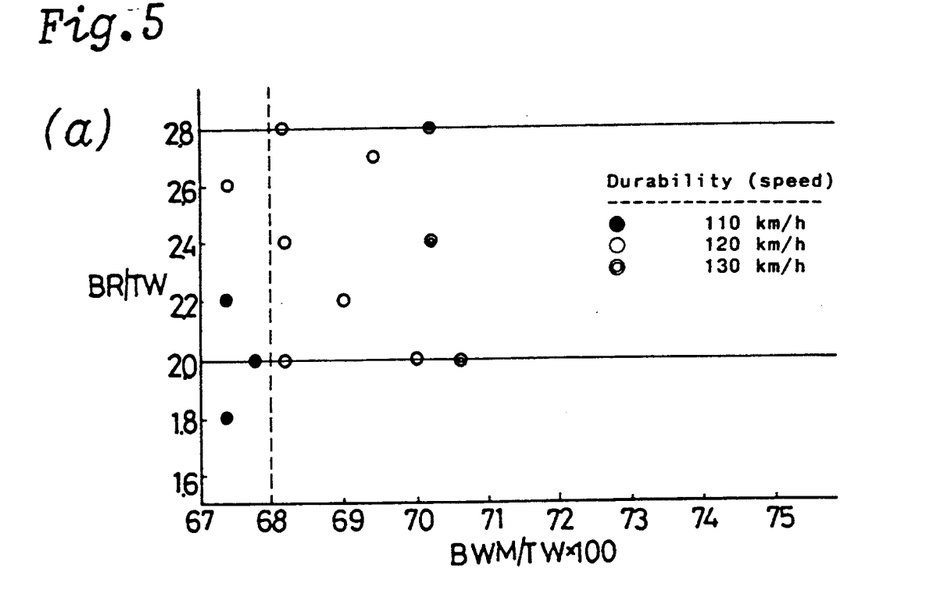

FIGS. 5(a) and 5(b) also shows the results of another test for high speed durability which was made varying the quotient BR/TW of the radius BR divided by the tire width TW and the quotient BWM/TW of the widest belt ply width BWM divided by the tire width TW. The test method was the same as above.

From the test results, it was again confirmed that, between the two tire groups, the distributional patterns of durability were shifted in the BWM/TW axis direction by about 0.02, that when BWM/TW was more than 0.68, a good durability could be obtained in the tires having an aspect ratio being not less than 0.85 and less than 1.2, and that when BWM/TW was more than 0.70, a good durability could be obtained in the test tires having an aspect ratio being not less than 0.7 and less than 0.85. The tire size in FIG. 5(a) was 11R24.5, and the tire size in FIG. 5(b) was 285/75R24.5.

The difference in the test results between the two tire groups is considered as follows: If a radial tire is not provided with any belt, the carcass will be inflated circularly. A low aspect ratio radial tire therefore, keep its shape by a large hooping force of the belt. The lower the aspect ratio, the larger the belt tension and stress. Therefore, the belt failure during high speed running occurs earlier in lower aspect ratio tires.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A heavy duty radial tire comprising
   a tread portion with a tread face,
   a pair of axially spaced bead portions,
   a pair of sidewall portions extending between tread edges and the bead portions,
   a pair of bead cores each disposed in each of the bead portions,
   a carcass having at least one ply of cords extending between the bead portions and turned up around the bead cores, and
   a belt disposed radially outside the carcass in the tread portion and composed of four plies of parallel cords laid at an angle of from 5 to 70 degrees with respect to the tire equator, said four plies including a first ply, a second ply, a third ply, and a fourth ply disposed in that order from the carcass toward the tread surface, the second ply being the widest of said four plies and the fourth ply being the narrowest of said four plies, the cords in the first ply inclined at a larger angle, and the cords in the second ply inclined at a smaller angle, with respect to the tire equator, the cords in the second ply inclined toward the same direction as the first ply with respect to the tire equator, the cords in the third ply inclined toward the reverse direction to the second ply with respect to the tire equator, the cords in each of the widest second ply and the third ply inclined at an angle of 14 to 22 degrees with respect to the tire equator, the difference RB1-RB2 of the belt radius RB1 measured at a pair of axially inner points P from the belt radius RB2 measured at a pair of axially outer points Q in an unloaded state being in the range of 0 to 0.05 times a half ground contacting width SL, wherein each of said belt radius RB1 and of said belt radius RB2 is defined as measured from the tire axis to the radially inner surface of the second ply, said pair of axially inner points P are defined on the radially inner surface and each spaced apart from the tire equator toward each side thereof by a distance of 0.25 times the axial width (BWM) of the second ply, said pair of axially outer points Q are defined on the radially inner surface and each spaced apart from the tire equator toward each side thereof by a distance of 0.45 times the axial width (BWM) of the second ply, said half ground contacting width SL is ½ of the axial width measured in said unloaded state between two points on the tread face which two points correspond to the axially outermost edges of the ground contacting area of the tread face in a loaded state, said loaded state is that the tire is mounted on its regular rim and inflated to its regular inner pressure and loaded with its regular tire load, and said unloaded state is that the tire is mounted on its regular rim and inflated to its regular inner pressure but loaded by no tire load, and in a cross section including the tire axis, the radially inner surface of the second ply having lateral parts each having a single radius (BR) of curvature being in the range of 2.0 to 2.8 times the maximum section width (TW) of the tire, each said lateral part defined as extending from each said axially inner point P to the axially outer edge thereof, wherein the aspect ratio of the tire is in the range from 0.85 to 1.2, and the axial width (BWM) of the second ply is in the range of 0.68 to 0.95 times the maximum tire section width.

2. A heavy duty radial tire comprising a tread portion with a tread face, a pair of axially spaced bead portions, a pair of sidewall portions extending between tread edges and the bead portions, a pair of bead cores each disposed in each of the bead portions, a carcass having at least one ply of cords extending between the bead portions and turned up around the bead cores, and a belt disposed radially outside the carcass in the tread portion and composed of four plies of parallel cords laid at an angle of from 5 to 70 degrees with respect to the tire equator, said four plies including a first ply, a second ply, a third ply, and a fourth ply disposed in that order from the carcass toward the tread surface, the second ply being the widest of said four plies and the fourth ply being the narrowest of said four plies, the cords in the first ply inclined at a larger angle, and the cords in the second ply inclined at a smaller angle, with respect to the tire equator, the cords in the second ply inclined toward the same direction as the first ply with respect to the tire equator, the cords in the third ply inclined toward the reverse direction to the second ply with respect to the tire equator, the cords in each of the widest second ply and the third ply inclined at an angle of 14 to 22 degrees with respect to the tire equator, the difference RB1-RB2 of the belt radius RB1 measured at a pair of axially inner points P from the belt radius RB2 measured at a pair of axially outer points Q in an unloaded state being in the range of 0 to 0.05 times a half ground contacting width SL, wherein each of said belt radius RB1 and of said belt radius RB2 is defined as measured from the tire axis to the radially inner surface of the second ply, said pair of axially inner points P are defined on the radially inner surface and each spaced apart from the tire equator toward each side thereof by a distance of 0.25 times the axial width (BWM) of the second ply, said pair of axially outer points Q are defined on the radially inner surface and each spaced apart from the tire equator toward each side thereof by a distance of 0.45 times the axial width (BWM) of the second ply, said half ground contacting width SL is ½ of the axial width measured in said unloaded state between two points on the tread face which two points correspond to the axially outermost edges of the ground contacting area of the tread face in a loaded state, said loaded state is that the tire is mounted on its regular rim and inflated to its regular inner pressure and loaded with its regular tire load, and said unloaded state is that the tire is mounted on its regular rim and inflated to its regular inner pressure but loaded by no tire load, and in a cross section including the tire axis, the radially inner surface of the second ply having lateral parts each having a single radius (BR) of curvature being in the range of 2.0 to 2.8 times the maximum section width (TW) of the tire, each said lateral part defined as extending from each said axially inner point P to the axially outer edge thereof, wherein the aspect ratio of the tire is in the range from 0.70 to less than 0.85, and the axial width (BWM) of the second ply is in the range of 0.7 to 0.95 times the maximum tire section width.

* * * * *